(12) United States Patent
Kinsella

(10) Patent No.: US 7,565,136 B1
(45) Date of Patent: Jul. 21, 2009

(54) MESSAGING SYSTEM

(75) Inventor: Mike Kinsella, Glasgow (GB)

(73) Assignee: Weeworld Limited, Glasgow (GB)

( * ) Notice: Subject to any disclaimer, the term of this patent is extended or adjusted under 35 U.S.C. 154(b) by 1059 days.

(21) Appl. No.: 09/592,563

(22) Filed: Jun. 12, 2000

(51) Int. Cl.
*H04Q 7/22* (2006.01)
*H04B 1/00* (2006.01)

(52) U.S. Cl. ............... 455/412.1; 455/414.1; 707/3

(58) Field of Classification Search ........... 455/412, 455/414, 416, 466, 412.1, 412.2, 414.1–414.3; 707/3, 5, 7, 9, 102; 709/219
See application file for complete search history.

(56) References Cited

U.S. PATENT DOCUMENTS 5,950,200 A    9/1999   Sudai et al. ............... 707/9

6,549,768 B1 *  4/2003  Fraccaroli ............... 455/414

FOREIGN PATENT DOCUMENTS

| WO | WO 90/13828 | 11/1990 |
| WO | WO 97/41654 | 11/1997 |
| WO | WO 99/66746 | 12/1999 |
| WO | 00/16209 | 3/2000 |
| WO | WO 00/22860 | 4/2000 |

* cited by examiner

*Primary Examiner*—Lee Nguyen
(74) *Attorney, Agent, or Firm*—Nixon & Vanderhye, PC

(57) ABSTRACT

A messaging system allows people (senders) to send messages to others (recipients) whom they have seen, using only a description of the recipient and information about the time and place where they were seen. Typically, text and/or multimedia messages will be sent from the sender's mobile telephone to the mobile telephone of one or more potential recipients via a central message pushing system which identifies potential recipients using a dynamically updatable database of members details.

23 Claims, 2 Drawing Sheets

MESSAGING SYSTEM

Figure 1:
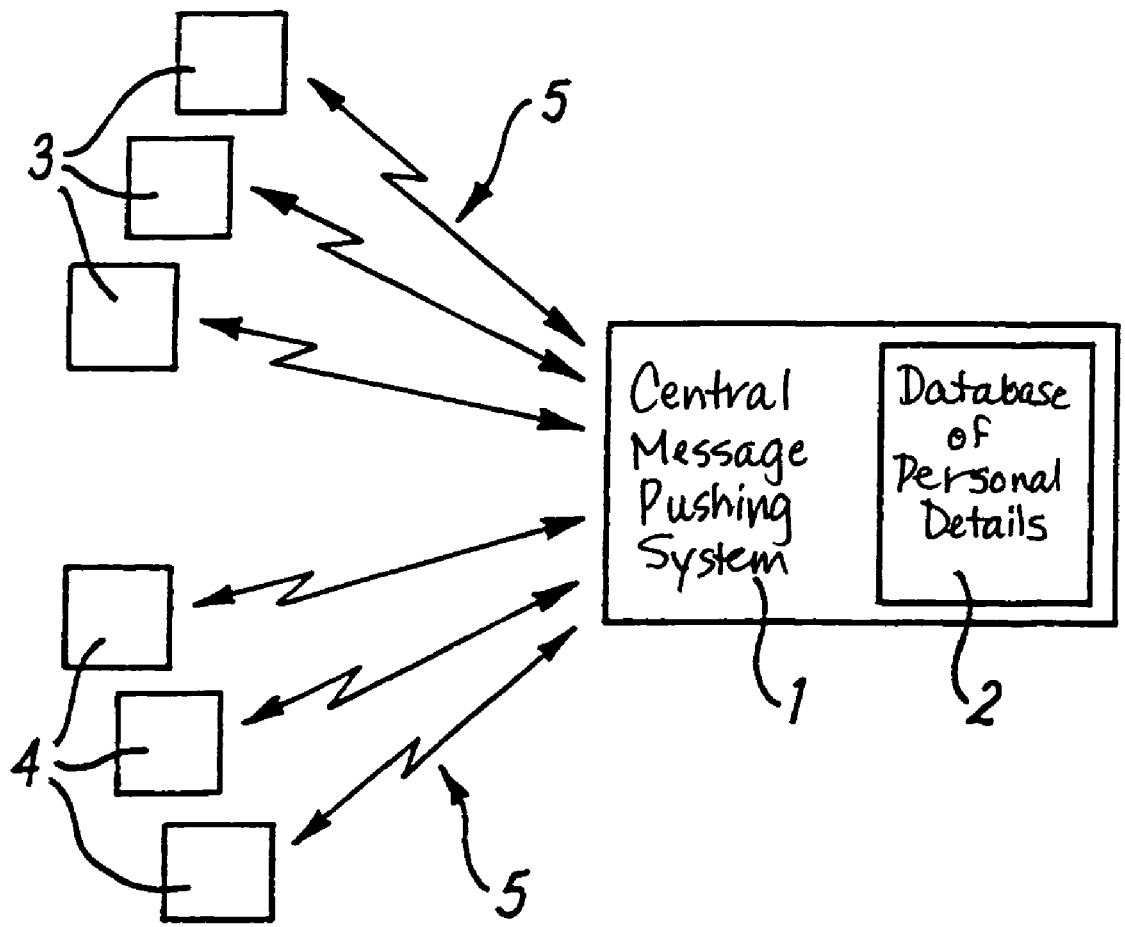

The invention relates to the general field of sending messages from one person to another, and more specifically to messaging methodology and hardware for use as an introduction/dating system. In particular, the invention enables a person to send a message to another person, without having to know specifically who they are.

BACKGROUND OF THE INVENTION

At the present time several magazines run a dating column where a person may leave a message for an unknown person whom they have seen or encountered, in the hope that said person will see the message and respond to them. This system is unsatisfactory because of the low probability that the person to whom they wish to send the message would see the message, the low probability that they would be able to recognise that it was themselves for whom it was intended and the fact that because they would not see it until some time after the chance meeting, they are less likely to want to respond.

The aim of the present invention is to allow a person to send a message to a stranger whom they encounter. Typically, they will send an e-mail or short text message from their own mobile telephone.

The invention aims to enable that message to reach the intended person and preferably to allow them to respond in a fun, safe and convenient fashion.

BRIEF SUMMARY OF THE INVENTION

The invention provides a new system, allowing people to send messages to other people who they have met in a chance encounter and whose conventional contact details (name, address, phone number, e-mail address etc.) they do not have.

According to the present invention there is provided a message pushing system for sending messages to recipients, the system comprising a database of details of individual potential recipients, telecommunications links for communicating with message sending and message receiving devices, the message pushing system being adapted to receive a message from a message sending means, the message comprising details of the intended recipient of the message, wherein the message pushing system compares the details of the intended recipient of the message with the database of potential recipient's details thereby establishing one or more members who may be the intended recipient, the message pushing system being adapted to transmit said message to the message receiving means of the one or more members who may be the intended recipient.

Preferably, the details of individual potential recipients include details of the individual's physical appearance. The details may be selected from a list comprising their sex, their hair length and colour, their eye colour, their age, their skin colour, their height, and their clothing.

Preferably, the database will also include the e-mail address, mobile telephone number, name, address or other contact details of individual potential recipients.

Preferably also, the database will also include locations where the potential recipient may be. The database may also contain the current location of the recipient. The database may also maintain a list of previous locations.

Preferably also, the message pushing system is adapted to allow potential recipients to update their details. This may be done automatically. Typically, potential recipients will update their details using their message sending means.

Preferably, the message pushing system allow messages to be delivered to recipients without the sender of the message knowing who the recipient is.

Typically, the comparison between the details of the potential recipient and member's details on the database does not need to be exact.

The database may also include information about how close a match between details is required for that message to be sent to that potential recipient.

The message sending means and message receiving means may be the same devices.

Typically, the message sending means and message receiving means will be mobile telephones using WAP or I-MODE.

The telecommunications links may comprise the internet.

The message may comprise one of an e-mail, a text message, a visual message or a multi-media message.

When transmitting the message to the message receiving means, the message pushing system may or may not send the description of the intended recipient of the message along with the rest of the message.

The database may be a relational database.

The message may be transmitted to the recipient only on request from the recipient. A web site may be used to display the message.

According to the second aspect of the present invention there is provided a messaging system comprising a message pushing system according to the first aspect of the present invention and a plurality of message sending and message receiving means, adapted to send messages to and receive message from the message pushing system.

According to a third aspect of the present invention there is provided a method of transmitting a message to one or more recipients, the method comprising the steps of:
  (a) creating a database of details of the appearance and location of individual potential recipients for messages;
  (b) receiving messages including details of the appearance and location of the intended recipient for a message;
  (c) comparing the details of the appearance and location of the intended recipient with the details stored in the database, thereby identifying one or more possible intended recipients.

Preferably, the method further comprises the step of sending the message to message receiving means belonging to the possible intended recipients.

Preferably, the details of individual potential recipients include details of the individual's physical appearance. The details may be selected from a list comprising their sex, their hair length and colour, their eye colour, their age, their skin colour, their height, and their clothing.

Preferably, the database will also include the e-mail address, mobile telephone number, name, address or other contact details of individual potential recipients.

Preferably also, the database will also include locations where the potential recipient may be. The database may also maintain a list of previous locations.

The database may also include information about how close a match between details is required for that message to be sent to that potential recipient.

Preferably also, the message pushing system is adapted/to allow potential recipients to update their details. This may be done automatically. Typically, potential recipients will update their details using a message sending means.

Preferably, the message pushing system allow messages to be delivered to recipients without the sender of the message knowing who the recipient is.

Typically, the comparison between the details of the potential recipient and member's details on the database does not need to be exact.

The message sending means and message receiving means may be the same devices.

Typically, the message sending means and message receiving means will be mobile telephones using WAP or I-MODE.

The telecommunications links may comprise the internet.

The message may comprise one of an e-mail, a text message, a visual message or a multi-media message.

When transmitting the message to the message receiving means, the message pushing system may or may not send the description of the intended recipient of the message along with the rest of the message.

The database may be a relational database.

BRIEF DESCRIPTION OF THE SEVERAL
VIEWS OF THE DRAWINGS

Figure 2:
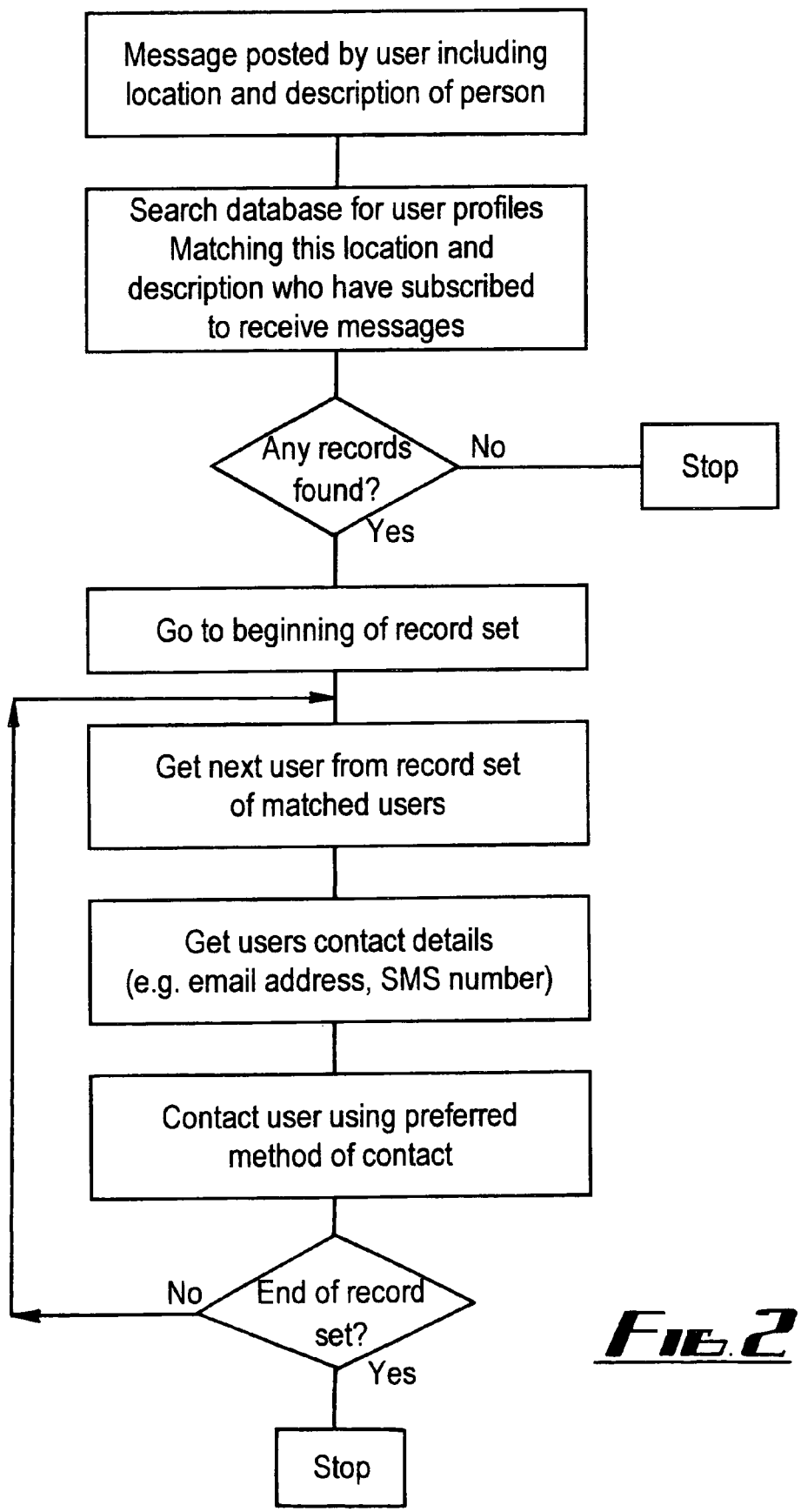

The present invention will be illustrated with reference to the following Figures in which:

FIG. 1 which shows a block diagram of components of the message pushing system; and FIG. 2 shows a flow chart of the message pushing system.

DETAILED DESCRIPTION OF THE INVENTION

The system shown in FIG. 1 comprises a central message pushing system 1 having a database 2 of personal details. Members of the service would supply the following types of information, although this list is provided purely by way of example and additional information might be added:
Name
E-Mail Address
Mobile phone number (for SMS messages)
Description Details:
   Sex—Male/Female
   Hair Colour—Dark, Red, Fair, etc
   Skin Colour—Dark, Fair
   Length of Hair—Short, Long
   Eye Colour
   Age
   Height
   Any other physical attribute
   Clothing details
User's locale (the city the user lives in)
Favorite locations (a list of bars, nightclubs, etc., that the person frequents)
User's current location (as set by the user)

The messaging system can then use this database to identify recipients for messages. An example of how the system would be used is as follows.

For example, a man in a nightclub could send a message to the message pushing system, using their WAP enabled mobile telephone, intended for a particular women he has seen standing at the bar. The sender has their own mobile communication device 3 and the system enables them to send a message to a recipient having a mobile communication device 4 via telecommunications links 5. Recipients need to be members of the service in order to have their details stored on the database 2. The central message pushing system has access to telecommunications links, the internet or other communication means for communicating with mobile communication devices 3,4.

The sender begins by composing their message, which might be a text message, an e-mail or multi-media message including sound or potentially even video. This message is then sent to the central message pushing system using their communications device. It will be clear to one skilled in the art that many types of communications device could be used, particularly WAP or I-MODE mobile telephones. The communications devices 3,4 need merely to be message sending means and message receiving means respectively. Mobile telephone device able to function as both message sending means and message receiving means are preferred.

As well as the message to be sent, the sender would then prepare a description of the person and location and time at which they have seen them, for example: the town, the name of the nightclub, a description, e.g., "tall woman, blond, wearing a red dress" and a time when the intended recipient was seen, which may be a particular day or more specific time.

This sender's message is then transmitted by known technology to the message pushing system. The message pushing system then interrogates the database to establish one, or typically several, potential recipients for the message. The message supplied by the user can then be transmitted directly to mobile telecommunications units owned by the recipient.

In order to establish which potential recipient may have been intended the system will take into account not just their physical appearance but also the location where they were seen and, usually, the time at which they were seen, comparing this with potential recipient's descriptions and information about their location or possible location. Only some descriptive terms need to match and appropriate database interrogation and data comparison techniques are apparent to one skilled in the art.

When members of the service set their own personal details, they will indicate how close a match they want before a message is transmitted to them. Some people might like to receive a lot of messages, only a fraction of which might be intended for them. Others would only wish to receive a message only if it was very likely intended for them.

Messages might be sent directly to recipients, alternatively a recipient might simply be informed that there is a message waiting for them at a location from it can be downloaded when they wish, for example a website Alternatively, the recipient might have to check a website to receive any messages. In the preferred embodiment, they will be notified immediately by their preferred communication method. There is no reason why user's could not send and receive messages from fixed terminals but mobile telecommunications devices are preferred.

Further information can be provided by members to help people identify them. Importantly, the database of member details 2 can be updated on demand by members, for example the person might supply information as to where they are going on that evening, which clubs, etc., so as to improve the chances of a match. They might also supply details of the clothing they are wearing that particular evening or even inform the database they have moved venues. In a further embodiment, it is envisaged that with the advent of mobile telephone positioning technology, such as mobile telephones containing global positioning system units or other mobile telephone locating technologies, it may be possible for member's mobile telephones to automatically update their current and historic location details on the central database.

The facility by which the database can be rapidly and dynamically updated by members substantially increases the probability of successfully sending the message to the right person.

Once they have received the message, the recipient can, if they wish, then reply to the sender, sending their own message to them. The message pushing system may allocate an alias to each sender or each sending event, enabling messages to be returned to the correct sender.

The simplest type of message would be merely a very general statement of where the person had been seen, for example, a city and details of a particular venue, such as a nightclub. In another embodiment, users might supply a more detailed description, including ideas of hair colour, what the person was wearing, their height and other distinguishing features, in order to gain a more accurate match.

Typically the above details will be stored in a relational database, however any other type or database known to the art, such as a object orientated database or a file, could be used.

FIG. 2 is a flow diagram illustrating the basic procedure for determining recipients for the messages. A sender beings by posting a message to the message pushing system, including location and description information as discussed above. The database then is interrogated for user profiles matching the location and description included with a message. If appropriate records are found, the system sequentially identifies user's contact details and instigates sending the message on to the user or users identified.

It will be seen from the above description that this system provides an highly innovative method of messaging. A method is provided for people to send messages to others whom they come across in a fun, convenient and anonymous way.

Revenues could be generated by asking members to pay a subscription, which is the preferred method.

Alternatively, other e-commerce techniques, such as pay-per-message or a linking message sending/receiving to the receipt of advertising could also be used to generate revenue.

As well as the application described above, the underlying technology and method may be used to send messages to unknown recipients in other circumstances, for example, to road user's by using a description of their vehicle.

Further improvements and modifications may be made within the scope of the invention herein disclosed.

The invention claimed is:

1. A method of transmitting a message to one or more recipients in a message pushing system that includes a database of user profiles of individual potential recipients and telecommunications links for communicating with message sending and message receiving devices, the method comprising:
   receiving a message from a message sending device, said message comprising details of an intended recipient of said message, wherein the details of the intended recipient included in the received message include a plurality of physical characteristics of the intended recipient observed by a sender of the message and a physical location of the intended recipient at the time the plurality of physical characteristics were observed by the sender;
   interrogating said database to find user profiles matching said details of the intended recipient of said message thereby establishing one or more members who may be the intended recipient; and
   transmitting said message to message receiving means of the one or more members who may be the intended recipient wherein the sender of the received message causes the message pushing system to interrogate said database and transmit said message from a current location that is different from the physical location of the intended recipient at the time the plurality of physical characteristics were observed by the sender.

2. The method of claim 1, wherein the details of individual potential recipients include details of the individual's physical appearance.

3. The method of claim 2, wherein the details are selected from a list comprising their sex, their hair length and colour, their eye colour, their age, their skin colour, their height, and their clothing.

4. The method of claim 2, wherein the database includes one or more of the e-mail address, mobile telephone number, name, address or other contact details of individual potential recipients.

5. The method of claim 2, wherein the database also includes information about the location of the recipient.

6. The method of claim 5, wherein the information about the location of the recipient includes the current location of the recipient.

7. The method of claim 5, wherein the information about the location of the recipient includes frequently visited locations.

8. The method of claim 5, wherein the information about the location of the recipient includes previous locations.

9. The method of claim 1, further comprising allowing potential recipients to update their details.

10. The method of claim 9, further comprising enabling potential recipients to update their details automatically.

11. The method of claim 9, further comprising enabling potential recipients to update their details using their message sending means.

12. The method of claim 1, further comprising allowing messages to be delivered to recipients without the sender of the message knowing the identity of the recipient.

13. The method of claim 1, wherein the matching between details of the intended recipient and user profiles does not need to be exact.

14. The method of claim 13, wherein the database also includes information about how close a match is required for that message to be sent to a potential recipient.

15. The method of claim 1, wherein one device can function as both a message sending device and a message receiving device.

16. The method of claim 15, wherein the message sending device and message receiving device are mobile telephones using WAP or I-MODE.

17. The method of claim 1, wherein the telecommunications links may comprise the Internet.

18. The method of claim 1, wherein the message comprises one of an e-mail, a text message, a visual message or a multi-media message.

19. The method of claim 1, wherein the database is a relational database.

20. The method of claim 1, wherein the message is transmitted to the recipient or recipients only on request from the recipient or recipients.

21. The method of claim 20, wherein a web site is used to display the message.

22. A method of transmitting a message to one or more recipients in a message pushing system that includes a database of user profiles of individual potential recipients and telecommunications links for communicating with message sending and message receiving devices, the method comprising:
   selecting an intended recipient for a message at a first location, and observing a plurality of personal characteristics of the intended recipient at the first location;
   generating a message at a second location using a message sending device, the message including the plurality of personal characteristics observed at the first location;

sending the generated message including the plurality of observed personal characteristics to a database of the message pushing system;

interrogating the database and comparing a plurality of user profiles stored in the database to the plurality of observed personal characteristics, and identifying one or more members who may be the intended recipient based on results of the interrogation; and transmitting the message to a message receiving device of the one or more members who may be the intended recipient.

23. The method of claim 22, wherein the first location is different than the second location.

* * * * *